(12) United States Patent
Nishiyama

(10) Patent No.: US 8,116,904 B2
(45) Date of Patent: Feb. 14, 2012

(54) OBJECT SEARCH APPARATUS AND METHOD

(75) Inventor: Manabu Nishiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 577 days.

(21) Appl. No.: 12/360,511

(22) Filed: Jan. 27, 2009

(65) Prior Publication Data

US 2009/0192647 A1      Jul. 30, 2009

(30) Foreign Application Priority Data

Jan. 29, 2008   (JP) ................. 2008-018105

(51) Int. Cl.
*G06F 7/00* (2006.01)
(52) U.S. Cl. ..................................... 700/215
(58) Field of Classification Search .................. 700/215, 700/245; 348/135, 161, 169; 382/103, 153, 382/291; 901/1, 47; 340/13.26, 12.51
See application file for complete search history.

(56) References Cited

U.S. PATENT DOCUMENTS

| | | | | |
|---|---|---|---|---|
| 7,187,998 B2* | 3/2007 | Okamoto et al. | ............. | 700/245 |
| 7,187,999 B2* | 3/2007 | Okamoto et al. | ............. | 700/245 |
| 7,191,035 B2* | 3/2007 | Okamoto et al. | ............. | 700/245 |
| 7,206,668 B2* | 4/2007 | Okamoto et al. | ............. | 700/245 |
| 7,209,803 B2* | 4/2007 | Okamoto et al. | ............. | 700/245 |
| 2006/0184279 A1* | 8/2006 | Okamoto et al. | ............. | 700/245 |
| 2007/0205861 A1* | 9/2007 | Nair et al. | ................... | 340/5.61 |

FOREIGN PATENT DOCUMENTS

JP      2007-034356 A    2/2007

OTHER PUBLICATIONS

U.S. Appl. No. 12/177,423, filed Jul. 22, 2008, Manabu Nishiyama.

* cited by examiner

*Primary Examiner* — Ramya Burgess
(74) *Attorney, Agent, or Firm* — Ohlandt, Greeley, Ruggiero & Perle, L.L.P.

(57) ABSTRACT

An object search apparatus acquires, from each IC tag of IC tags corresponding to objects respectively, an object information item including an identifier of an object, a hierarchical level, a detection method for detection of the object, and a manipulation method for the object, to obtain a plurality of object information items including a target object information item of a target object, selects, from the object information items, an object information item higher in the hierarchical level than the target object, detects an object corresponding to selected object information item by using the detection method in the selected object information item, manipulates detected object in accordance with the manipulation method in the selected object information item, selects target object information item from the object information items, and detects the target object from the detected object by using the detection method in the target object information item.

9 Claims, 11 Drawing Sheets

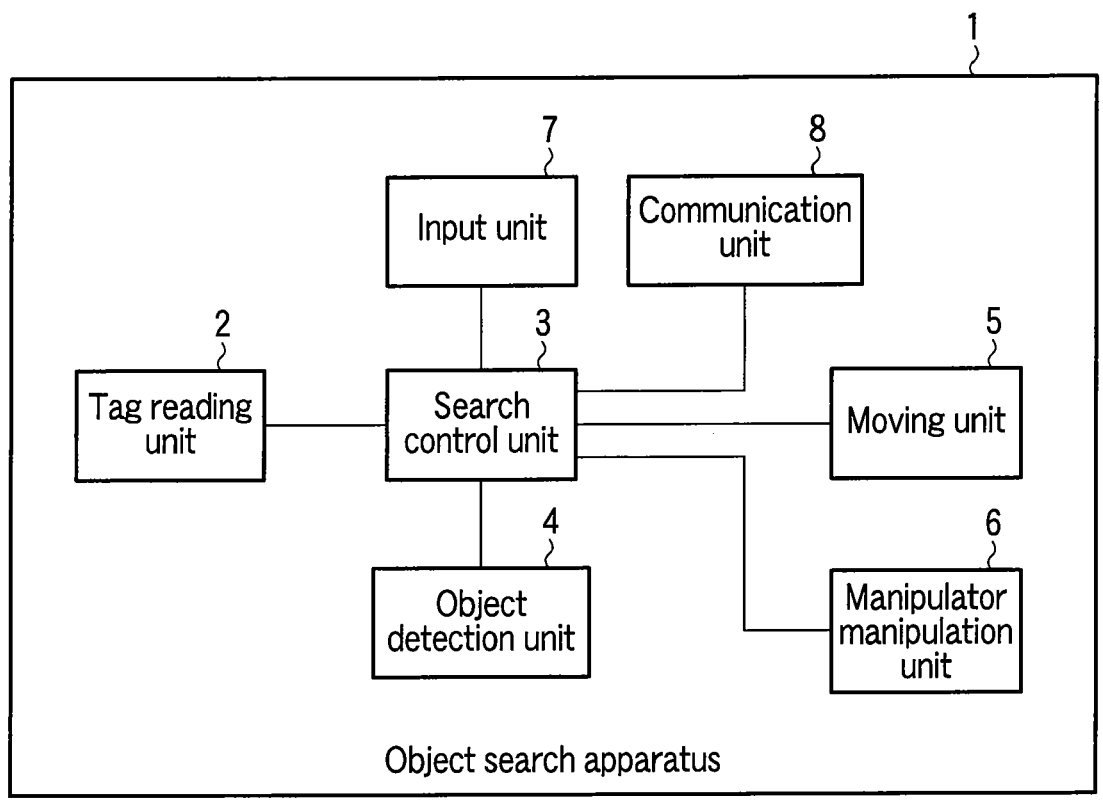
F I G. 1
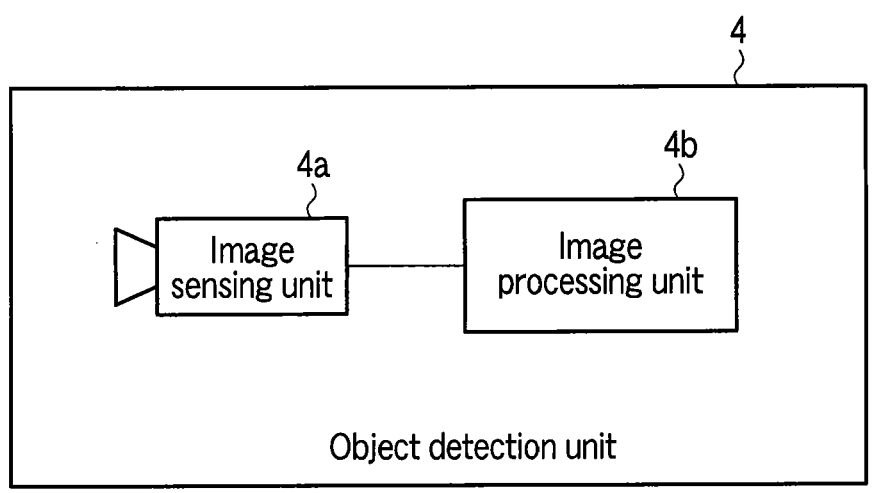
F I G. 2

| Tag ID | f074e19e-1037-421e |
|---|---|
| Type | Refrigerator |
| Detection method | Threshold processing for colors : R>150, G>150, B>150 |
| Manipulation method | pull : (60, 100, 0) |
| Hierarchical level | 2 (furniture) |
F I G. 5
| Tag ID | 4dc05828-ff59-4508 |
|---|---|
| Type | Cup |
| Detection method | Ellipse detection : r=40mm |
| Manipulation method | grip : (0, 0, 40) |
| Hierarchical level | 4 (handling target) |
F I G. 6
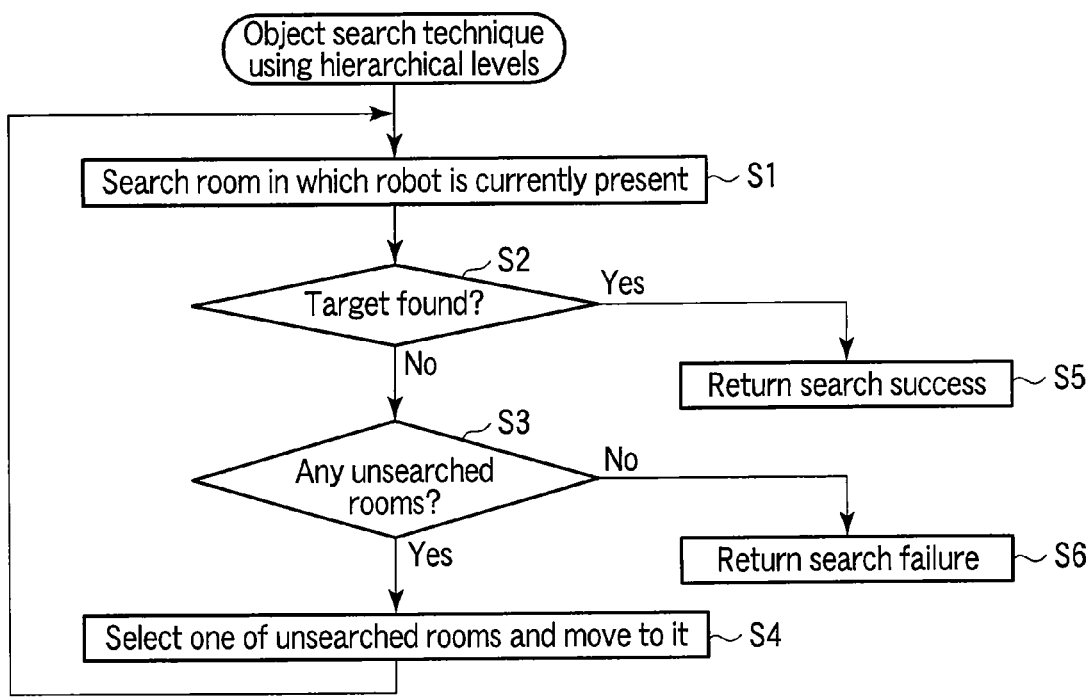
F I G. 7

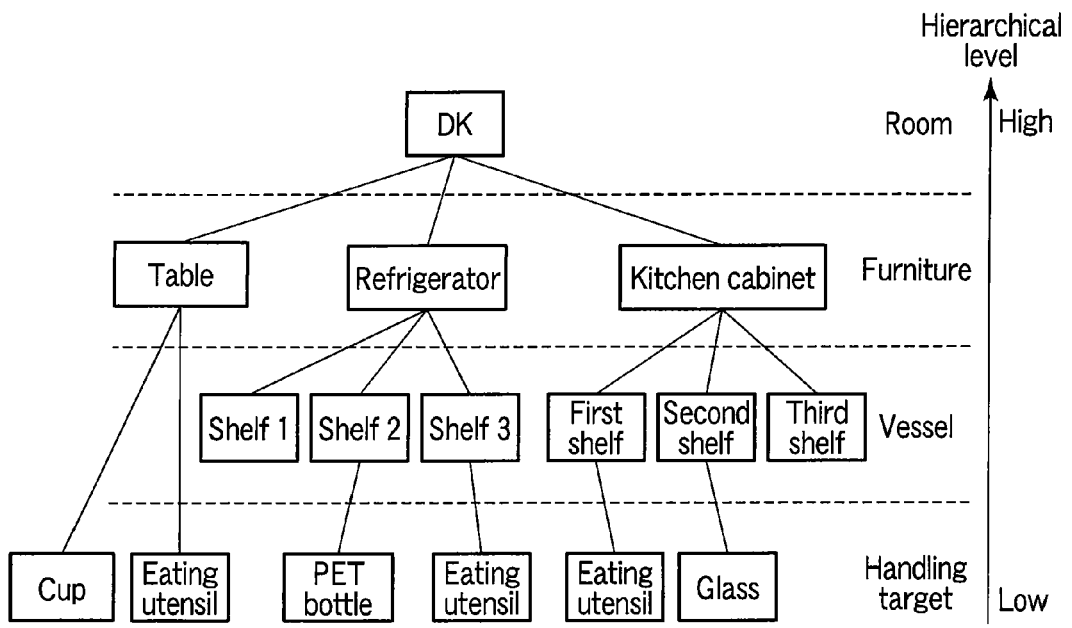
F I G. 9
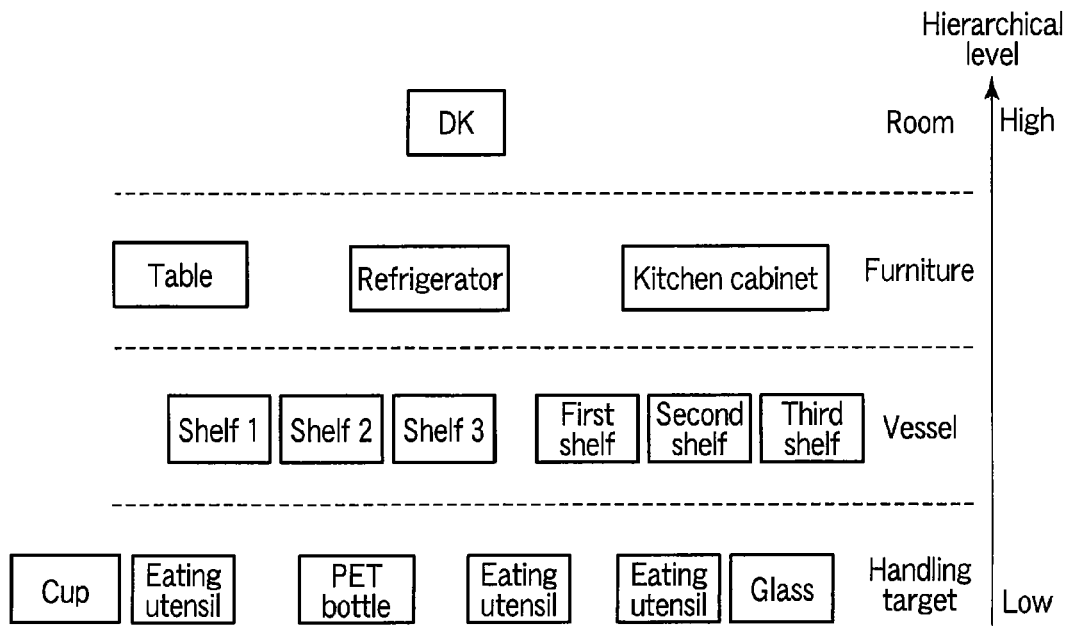
F I G. 10

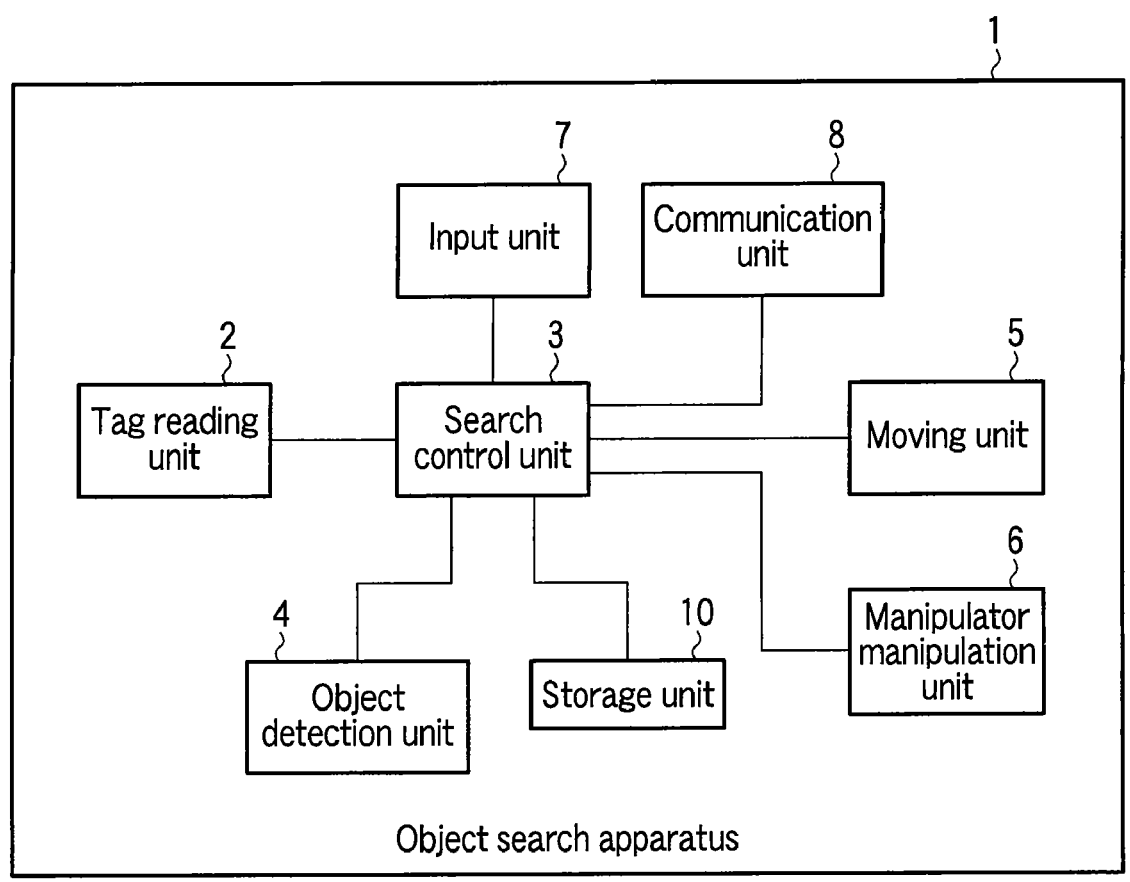
F I G. 16

OBJECT SEARCH APPARATUS AND METHOD

CROSS-REFERENCE TO RELATED APPLICATIONS

This application is based upon and claims the benefit of priority from prior Japanese Patent Application No. 2008-018105, filed Jan. 29, 2008, the entire contents of which are incorporated herein by reference.

BACKGROUND OF THE INVENTION

1. Field of the Invention

The present invention relates to an object search apparatus which searches for objects scattered in an environment.

2. Description of the Related Art

There are many robot systems, including those for industries and researches, which sense the positions of target objects by using visual information and the like and control manipulator apparatuses on the basis of detected information. Assume that a robot system is introduced into a home to fetch objects such as eating utensils and PET bottles and to carry them to other places. In this case, a target object is not necessarily located in a place where the robot can see it. In many cases, such objects are placed in a cabinet or a refrigerator. In order to reliably find a target object in such a situation, it is necessary to comprehend, in some form, the inclusion relationship or positional relationship (to be referred to as a hierarchical relationship hereinafter) between objects, which indicates that, for example, an object A is placed in an object B (or on object B).

According to a technique of managing the hierarchical relationship between objects, which is disclosed in, for example, JP-A 2007-34356, radio-frequency identification (RFID) tags are attached to search target objects in advance, and tag readers are installed in predetermined places such as shelves. When each object is placed on a given shelf, the tag reader set on the shelf reads the RFID tag information of the object. A hierarchical relationship indicating that the object is placed on the shelf is then stored. The respective tag readers installed on the respective shelves are managed hierarchically in advance, and the hierarchical relationship between the respective objects and the shelves on which the objects are placed is stored in the above manner, thereby managing a specific object as a target object with hierarchical position information, for example, indicating that the object "is in the third drawer of a cabinet A".

Assume that the positions of a plurality of objects are hierarchically managed in this manner. In this case, when, for example, a desired object in the third drawer of the cabinet A is to be found, the shelf A is found first, and the third drawer of the cabinet A is found next. The desired object is then found from the drawer. In this manner, it is possible to search for a desired object in a proper sequence in consideration of the hierarchical structure within a short period of time. It can therefore be expected to greatly improve the reliability of reaching the desired object.

In order to manage the positions of a plurality of objects in the above manner by storing, in advance, them by using the hierarchical structure of a storage facility such as a cabinet and its drawers in which the plurality of objects are stored, it is necessary to install tag readers, in advance, at the respective storage positions on the respective object shelves, in the drawers, and the like. In addition, it is necessary to use a database for storing the hierarchical relationship of all the installed tag readers and the position information of each object detected by a corresponding tag reader. This is a feasible arrangement. However, an apparatus used to implement such an arrangement is very large in scale in a small-scale environment such as a home.

As described above, the conventional problem is that it is impossible to easily search for a plurality of objects (e.g., vessels and tools) scattered in a relatively small-scale environment such as a home (residence) by using a hierarchical positional relationship.

The present invention has therefore been made in consideration of the above problem, and has as its object to provide an object search apparatus and method which can easily search for a plurality of scattered objects.

BRIEF DESCRIPTION OF THE SEVERAL VIEWS OF THE DRAWING

FIG. 1 is a block diagram showing an example of the arrangement of an object search apparatus;

FIG. 2 is a view showing an example of the arrangement of an object detection unit;

FIG. 5 is a view showing an example of the object information of a refrigerator;

FIG. 6 is a view showing an example of the object information of a cup;

FIG. 7 is a flowchart for explaining an outline of the processing operation of the object search apparatus;

FIG. 9 is a view showing a concrete example of the hierarchical positional relationship between objects scattered in a dining-room/kitchen (DK) environment;

FIG. 10 is a view showing information (i.e., the hierarchical level of each object) obtained by causing the object search apparatus to patrol in a DK;

FIG. 16 is a block diagram showing another example of the arrangement of the object search apparatus.

DETAILED DESCRIPTION OF THE INVENTION

Figure 3:
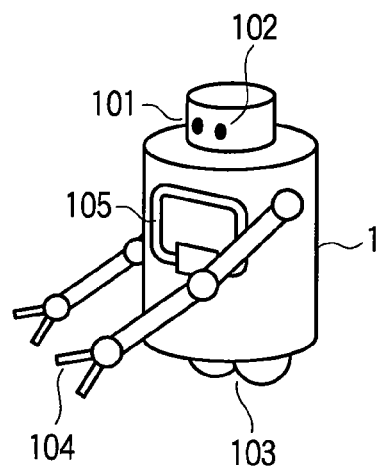
FIG. 3 is a perspective view showing an example of an object search apparatus 1 including the object detection unit having the arrangement shown in FIG. 2.

The following is a case in which searches are made for objects such as tools and vessels scattered in a residence. RFID IC tags (radio tags) are provided for the respective objects scattered in a residence (for example, IC tags are affixed to the respective objects).

As shown in FIG. 1, a object search apparatus 1 includes a tag reading unit 2, a search control unit 3, an object detection unit 4, a moving unit 5, a manipulator manipulation unit 6, an input unit 7, and a communication unit 8.

The tag reading unit 2 includes an RFID tag reader 105 for reading object information stored in the IC tag affixed to each object.

The search control unit 3 determines the processing operation or processing sequence to be performed next by the object search apparatus by using the object information read by the tag reading unit 2, and controls the tag reading unit 2, the object detection unit 4, the moving unit 5, the manipulator manipulation unit 6, and the like. The search control unit 3 determines, for example, a sequence for search processing to perform search processing for an object on a lower hierarchical layer or search processing for acquiring another object information other than currently acquired object information by changing the reception range in which the tag reading unit 2 receives object information.

The object detection unit 4 performs object detection processing in accordance with an instruction from the search control unit 3.

The manipulator manipulation unit 6 manipulates an arm or the like to perform handling such as gasping an object in accordance with an instruction from the search control unit 3.

The input unit 7 is used to input a search instruction to the object search apparatus 1.

The communication unit 8 communicates with a terminal such as a PDA, personal computer, or remote controller to receive a search instruction input from the terminal to the object search apparatus 1.

The search instruction input via the input unit 7 or the communication unit 8 is sent to the search control unit 3.

The moving unit 5 moves the position of the object search apparatus 1 (position of at least one of the tag reading unit 2, the object detection unit 4, and an arm 104) by driving, for example, wheels in accordance with an instruction from the search control unit 3.

The object detection unit 4 as shown in FIG. 2 acquires an image and detects an object from the image. The object detection unit 4 in FIG. 2 includes an image sensing unit 4a including a camera and the like and an image processing unit 4b which performs image processing for the detection of an object from the image data obtained by the image sensing unit 4a. The image processing unit 4b includes a memory which stores a plurality of types of image processing programs and a processor for executing the programs stored in the memory. The processor detects a target object from the image captured by the image sensing unit 4a by executing one of the plurality of types of image processing programs stored in the memory which is instructed from the search control unit 3, and notifies the search control unit 3 of the detection result.

FIG. 3 shows an example of a mobile robot.

Eyes 101 and 102 of the robot in FIG. 3 each correspond to the image sensing unit 4a which acquires an image of an object. This robot further includes wheels 103 driven by the moving unit 5 and the arm 104 which are manipulated by the manipulator manipulation unit 6 to handle an object. An RFID tag reader 105 mounted at the chest portion is part of the tag reading unit 2.

Upon receiving a search instruction for a search target object, e.g., an instruction to "fetch a PET bottle", from the input unit 7, the robot having the above arrangement searches a home environment for a PET bottle as a target object, detects that the PET bottle is in the refrigerator, and brings it back.

A plurality of objects as search targets for the object search apparatus 1 in FIG. 1 in a home environment will be described with reference to FIG. 4.

Figure 4:
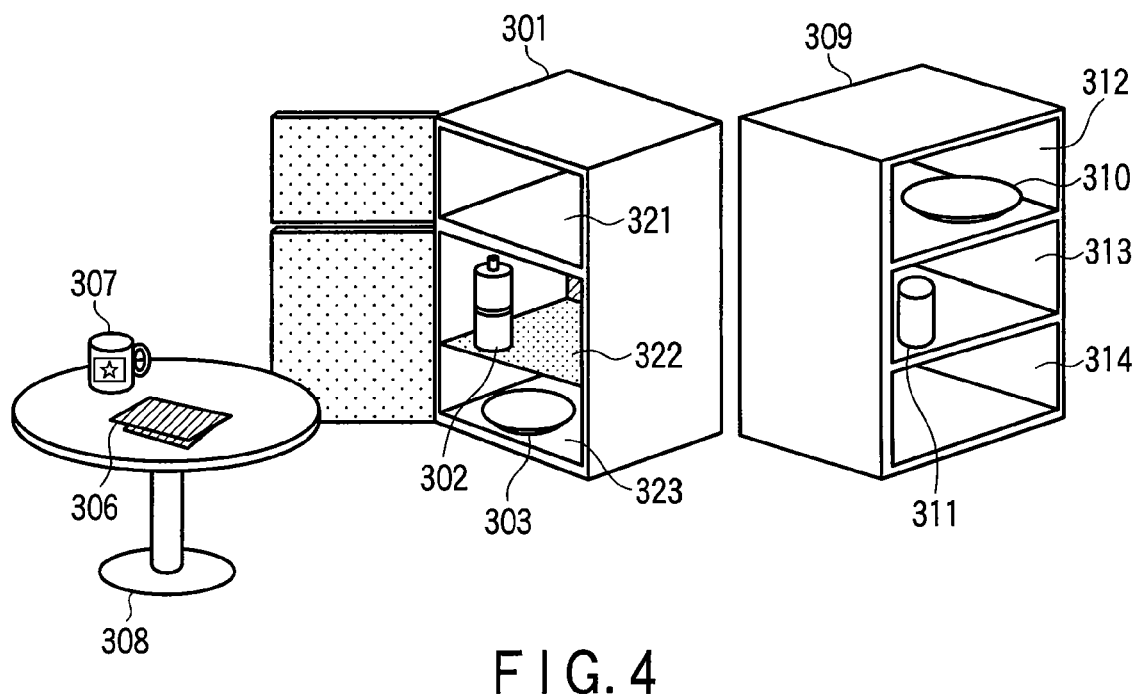
FIG. 4 is a perspective view showing objects scattered in a dining kitchen searched by the object search apparatus in FIG. 1.

In this case, as shown in FIG. 4, objects include objects at the "handling target" (search targets for the object search apparatus 1) level, e.g., eating utensils 303, 306, and 310, a PET bottle 302, a cup 307, and a glass 311, objects at the "furniture" level, e.g., a refrigerator 301, a table 308, and a kitchen cabinet 309, and objects at the "vessel" level, e.g., shelves 321 to 323 in the refrigerator 301 and shelves or drawers 312 to 314 of the kitchen cabinet 309. In addition, there are objects at the "room" level, which include objects belonging to the respective levels such as the "furniture" level, the "vessel" level, and the "handling target" level.

Of the hierarchical levels of the respective objects, the "room" level is highest. The "furniture" level is subordinate to the "room" level, which includes "furnitures" arranged in the "room". The "vessel" level is subordinate to the "furniture" level, which includes "vessels" corresponding to shelves or drawers of the "furnitures". The "handling target" level is subordinate to the "vessel" level, which includes "handling targets" arranged in the "vessels".

Hierarchical levels are determined for the respective objects in accordance with the types. In this case, the hierarchical levels are represented by numerical values. For example, the "room" level, the "furniture" level, the "vessel" level, and the "handling target" level are respectively expressed by the integral values "1", "2", "3", and "4". In this case, for example, smaller values indicate higher hierarchical levels.

A hierarchical level needs to be attached to an object to which an IC tag is affixed. An object which is determined to belong to an intermediate hierarchical layer, e.g., a box in a drawer at the "vessel" level, is provided with a real number such as "3.5" as a hierarchical level which represents that the object belongs to the intermediate layer.

Object information is stored in an IC tag affixed to each object. Object information includes the following items of information:

an identifier (tag ID) unique to the object;

the type of the object (e.g., a refrigerator, a table, a kitchen cabinet, the first shelf in the refrigerator, a PET bottle, or a dish);

a hierarchical level representing a specific hierarchical layer such as "handling target", "vessel", "furniture", or "room" to which the object belongs;

a detection method for detecting the object (type of image processing required for the detection of the object (e.g., the identification information of an image processing program) and parameters used for the image processing (e.g., feature information required for the determination of the object [conditions, parameters, and the like]); and a manipulation method for the object which is used to shift to a hierarchical layer lower than that of the object (manipulation method for the object which is required to detect an object group [lower in hierarchical level than the object] which the object has, e.g., a door opening method for the object [a grasping point and grasping posture to open the door and operating direction]) or a handling method for the object.

Note that the above object information can be directly written in the storage area of the IC tag. Alternatively, the following mode may be implemented: reading only the ID of the tag from the IC tag and reading the above object information from a separately prepared database by using the ID as a key.

The object information of the refrigerator 301 in FIG. 5 includes, in addition to the tag ID, the type, and the hierarchical level, the identification information of an image processing program for extracting color components from the image data obtained by the image sensing unit 4a and parameters necessary for the determination that the extracted color component values correspond to the refrigerator (e.g., a threshold for each color for the determination that each extracted color component value corresponds to the refrigerator). The manipulation method includes the coordinates of a door handle and the operation of pulling the door handle.

The object information of the cup 307 in FIG. 6 includes, in addition to the tag ID, the type, and the hierarchical level, the identification information of an image processing program for the detection of an elliptical shape from the image data obtained by the image sensing unit 4a and parameters necessary for the image processing (e.g., the size of an ellipse for the determination that the extracted ellipse is the cup). The manipulation method includes the coordinates of the handle of the cup and the operation of grasping the handle.

A plurality of types of image processing programs necessary for object detection are stored in the memory in the image processing unit 4b. The plurality of types of image processing programs stored in the memory are, for example:

(1) a program for region detection processing which uses thresholds for the R, G, and B values of pixels;

(2) a program for template matching processing which uses the texture information of an object as a template to detect a similar object from an image; and (3) a program for ellipse detection processing which detects an elliptical portion from an edge component in an image.

In the region detection processing (1) described above, threshold conditions for R, G, and B of a pixel are received as parameters. These conditions state, for example, that "R>150, G<230, and no condition for B". Such parameters are expressed by numerical value strings or character strings and included in object information.

According to a processing sequence, first of all, it is determined whether the respective pixels in an image input from the image sensing unit 4a to the image processing unit 4b match threshold conditions provided as parameters, and the image is binarized in accordance with the matching results. The binarized image is then segmented into regions in which pixels matching the conditions are continuous. Of the plurality of obtained regions, any region whose area is equal to or more than a predetermined threshold is detected as a detected area (detection of a target object has succeeded). Images of a target region are captured by using a plurality of cameras. The above processing is performed for one of the captured images. The detected region is used as a template to perform template matching with another image. Using the principle of stereo vision can acquire the three-dimensional position information of the detected object.

In the template matching processing (2) described above, a captured image of an object to be detected is used as a template. A search for a position with the highest similarity is made by repeatedly cutting out an image with the same size as that of the template from the image captured by the image sensing unit 4a. If the similarity is highest and is higher than a predetermined threshold, it is determined that the corresponding region in the image is an object to be detected. As a similarity, it is possible to use the sum of the absolute values of the differences between the pixel values of the template and those of the input image or the sum of the squares of the differences. As in the region detection processing (1) using thresholds, it is possible to calculate the three-dimensional position of the detected object by performing stereo vision between a plurality of images. No search is made for any invalid region in the image. Template matching processing is performed by using different templates for the respective objects. Therefore, the parameter included in image processing information is an ID representing the template of an object to be found by matching. This information can be written as an integral value.

The ellipse detection processing (3) is used to detect an object having a circular portion like a bowl or dish. In the processing sequence, first of all, edge information is extracted from the image acquired by the image sensing unit 4a by a technique like Canny operator. Each edge obtained by concatenating items of edge information is segmented. Parameters A, B, C, D, E, and F are obtained by the least squares method when the following ellipse equation is applied to each segmented edge.

$$Ax^2+By^2+Cxy+Dx+Ey+F=0$$

The quality of the obtained ellipse is then evaluated by obtaining the distance between the ellipse and the edge. An ellipse whose evaluation value is equal to or more than a predetermined value is determined as an elliptical object. In the case of this algorithm, using stereo vision makes it possible to obtain the actual size of the detected ellipse in addition to the three-dimensional position of the object. Objects are narrowed down by using this size information. Therefore, the actual size of the object (ellipse) is used as a parameter for a threshold condition to be used for the determination of the object in the ellipse detection processing. The object information includes this as a detection method for the object. For example, the object information includes a threshold condition written as a real number like "this dish has a diameter of 60 mm".

In the detection method obtained from object information, a parameter used for the detection processing can be expressed by the above numerical value string or character string. Three types of image processing described above are merely examples, and do not limit the image processing to be actually implemented. Information provided for each type of image processing can be recorded in an IC tag or database as in the above case. In addition, the ID of an image processing program can be expressed by using a serial number or a character string representing a program name.

The processing operation of the object search apparatus (robot in FIG. 3) 1 in FIG. 1 will be described next with reference to the flowchart shown in FIG. 7.

The following exemplifies a case in which the robot 1 on standby in some room in a home has received a search instruction designating only a handling target object like "fetch PET bottle with ID be9f3e27-8869-4052" from the user. The search instruction from the user is input from the input unit 7 or the communication unit 8.

The user inputs an ID (tag ID) corresponding to a desired object by, for example, selecting the desired object from a list of objects displayed on the display which the input unit 7 has or by uttering the desired object name "PET bottle" based on voice recognition. When voice input is to be performed, the input unit 7 needs to have a voice recognition function. For example, the user inputs "PET bottle" or a command designating this by voice. The input unit 7 obtains a corresponding ID from the voice recognition result.

The user can input the ID of a desired object from the terminal owned by him/her via the communication unit 8 in the same manner as described above. The terminal can be a PDA or personal computer. In addition, the terminal may include a voice recognition function. For example, the user inputs the ID by selecting a desired object from a list of objects displayed on the display which the terminal has or by designating "PET bottle" by voice.

An object whose hierarchical level corresponds to "room" will be described below. Object information at the "room" level is not attached to an actual room itself but is attached to an object such as a door, sliding door, or accordion curtain which serves as a partition between rooms. Tags corresponding to two rooms are affixed to one partition, and the same ID is assigned to a plurality of partitions in the same room or assigning "type" to them, thereby allowing recognition of the same room. If two rooms are directly partitioned by a door or the like, no problem arises when object information at the "room" level is set in this manner, because the presence of the partition itself corresponds to the presence of the room. Even if two rooms are connected through a corridor, interpreting the corridor as one room holds the correspondence of "presence of partition=presence of room".

FIG. 7 explains a sequence in which the robot 1 moves between rooms in search operation upon receiving an instruction. Upon receiving a search instruction via the input unit 7 or the communication unit 8, the search control unit 3 of the robot 1 issues an instruction to the moving unit 5 to drive the wheels, thereby searching the room in which the robot has been standing by for a target object ("PET bottle with ID be9f3e27-8869-4052" in this case) as a detection target (step S1). A search sequence in each room will be described later. If the tag reading unit 2 receives the object information of an object at the "room" level, e.g., a door, at this stage of search, the information is stored in the memory in the search control unit 3. That is, if the tag reading unit 2 receives items of object information of the currently searched room and other rooms, the items of information are stored in the memory.

When the search in this room is complete, the process advances to step S2, in which the search control unit 3 determines on the basis of the received object information whether the target object has been detected. If the target object has been detected, the process advances to step S5, in which the search control unit 3 returns "search success". In this case, the search control unit 3 may transmit a message indicating "search success" to the terminal owned by the user via the communication unit 8. In practice, the robot then executes processing operation based on an application, e.g., grasping the target object and carrying it to another room, in accordance with an instruction from the search control unit 3. If it is determined in step S2 that the target object could not be detected, the process advances to step S3.

If it is determined in step S3 that there is a room, of the items of object information at the "room" level which have been received during search operation in step S1, which has not been searched, the process advances to step S4. If there is no object information of an unsearched room, it indicates that the robot has patrolled all the rooms and completed the search. In this case, the process advances to step S6. Note that if no tag is affixed to a door in a room, the process advances to step S6 immediately after a search for the first room. In step S6, the search control unit 3 returns "search failure" and terminates the processing. In this case, the search control unit 3 may transmit a message indicating "search failure" to the terminal owned by the user via the communication unit 8. The application using this system determines which action the robot 1 takes after the search failure is determined.

If it is determined in step S3 that there is a room which has not been searched, the process advances to step S4. In step S4, one of the items of object information of objects at the "room" level which have not been searched is selected, and the robot moves to the room. As a specific method of selecting a room (its object information), there is available a method in which every time the tag reading unit 2 receives object information at the "room" level which has not been searched, the search control unit 3 pushes the object information or its object ID onto a stack in the search control unit. In this case, in step S4, the newest object information added last is popped from the stack. According to this method, a room nearest to the currently searched room is selected, and hence the robot can be expected to efficiently move. Detection of doors (partitions), knob manipulation, and the like for the movement are the same processes (to be described later) as those for a search in a room.

Causing the robot 1 to search for a target object while moving between a plurality of rooms in the above sequence makes it possible to patrol all the rooms without complicated map data of a home environment. This method has a secondary effect that an entry-prohibited room can be easily set by not affixing any tag to the door.

A search processing sequence in each room in steps S1 to S3 in FIG. 7 will be described next in more detail with reference to the flowchart of FIG. 8. In the following description, assume a case in which the robot 1 which has received a search instruction "fetch PET bottle with ID be9f3e27-8869-4052" enters a dining-room/kitchen (DK) in which objects are arranged and searches for the PET bottle 302 among them, as shown in FIG. 4. FIG. 9 shows the hierarchical positional relationship between the respective objects in FIG. 4. However, this embodiment need not store/manage such a hierarchical positional relationship itself. The robot recognizes the hierarchical levels to which the respective objects belong as shown in FIG. 10 from the hierarchical levels in the object information received during a search action. There is no need to recognize the connection relationship between upper and lower hierarchical layers (hierarchical positional relationship between the objects) from the received object information of each object. Performing processing operation like that shown in FIG. 8, the robot 1 recognizes the hierarchical positional relationship between a plurality of objects whose object information has been received.

Figure 8:
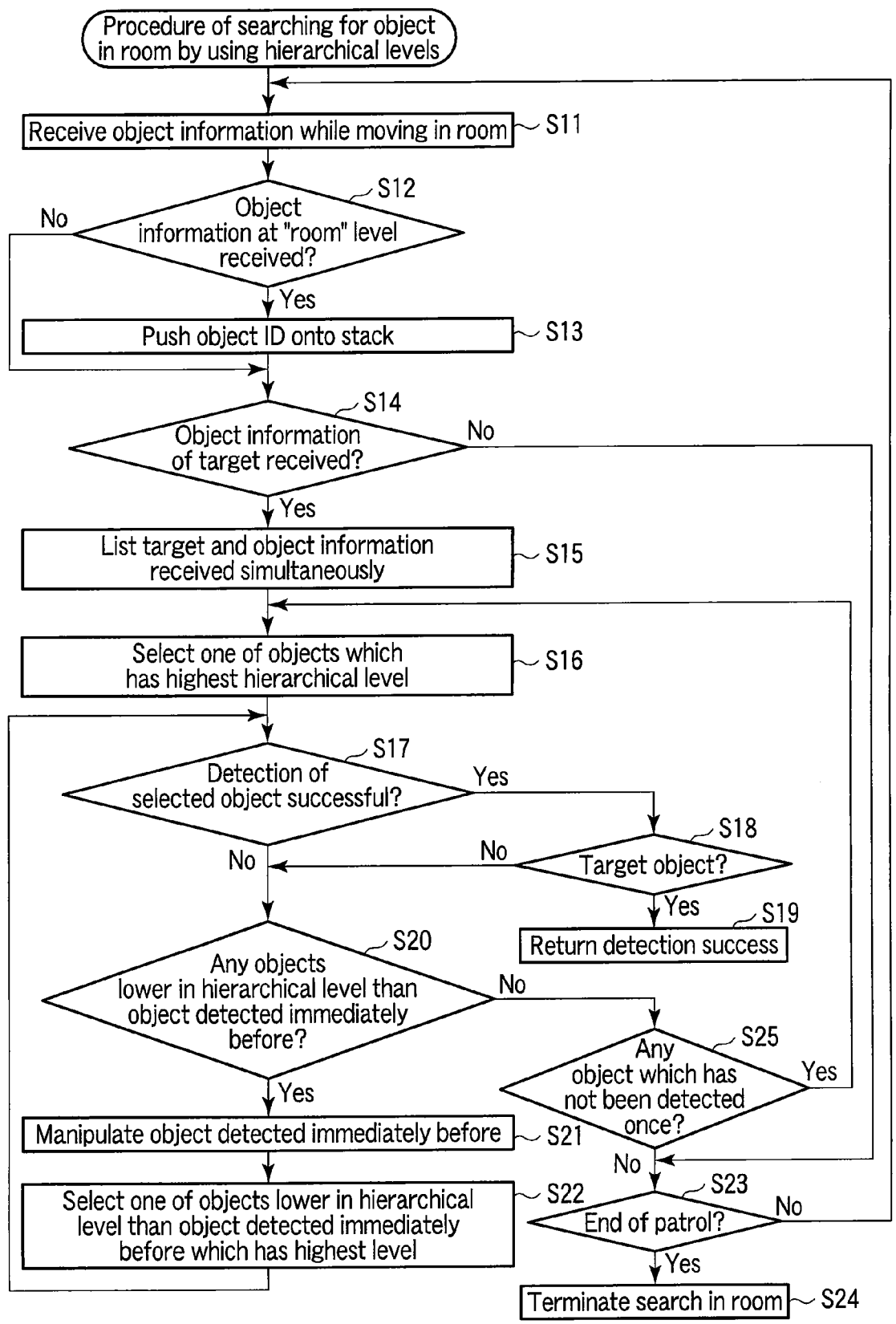
FIG. 8 is a flowchart for explaining a search sequence performed by the object search apparatus in a room.

In step S11 in FIG. 8, the search control unit 3 of the robot 1 issues an instruction to the moving unit 5 to drive the wheels so as to make the tag reading unit 2 read the object information of each IC tag near the robot 1 while making the robot patrol in the room. Upon receiving object information from each IC tag, the search control unit 3 checks whether the items of object information include object information whose hierarchical level is the "room" level or the tag IDs in the items of object information include a tag ID matching the ID of a search target object (target object).

If the items of received object information include object information whose hierarchical level is the "room" level (step S12), the process advances to step S13 to push the corresponding object information onto the stack in the search control unit 3. The object information at the "room" level held on the stack is used for movement between rooms in FIG. 7, as described above.

If the items of received object information include no object information whose hierarchical level is the "room" level, the process advances to step S14 to check whether the items of object information include object information whose tag ID matching the ID of the search target object (target object). If there is no object information having an ID matching the ID of the target object, the process advances to steps S23 and S11 to express that there is no target object near the current position of the robot 1. The robot 1 keeps patrolling. If it is determined in step S14 that object information having an ID matching the ID of the target object is received, it indicates that the target object is located near the current position. The search control unit 3 therefore stops patrolling. The process then advances to step S15 to start a full-fledged search.

Note that the items of object information received in step S11 include neither object information at the "room" level nor object information of the target object, or no object information is received, the process advances to step S23. If it is determined in step S23 that patrolling in the room is complete, the search in the room is terminated. The process then advances to step S4 in FIG. 7. If patrolling is not complete, the process returns to step S11 to repeat the same sequence.

In step S15 and subsequent steps, search processing is performed after the position of the target object is narrowed down. First of all, in step S15, the search control unit 3 stops the patrolling/moving action, and records the object information of the target object and an object information group including object information other than that at the "room" level in the memory in the search control unit 3.

Figure 11:
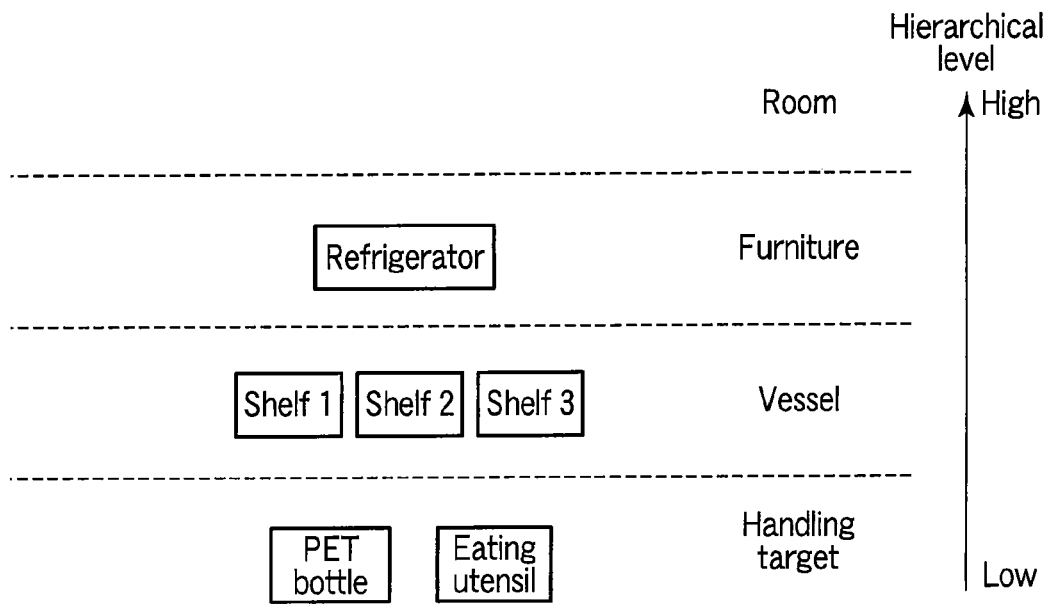
FIG. 11 is a view showing information (hierarchical level of each object) obtained from an object information group received by the object search apparatus near the refrigerator in the DK.
Figure 12:
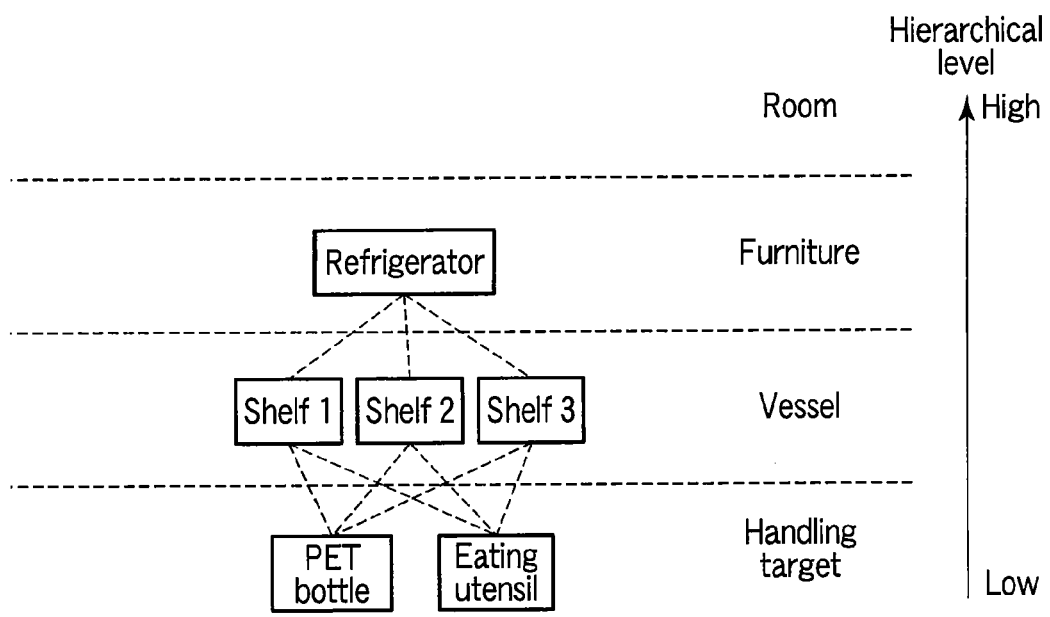
FIG. 12 is a view showing the hierarchical positional relationship between the objects shown in FIG. 11 which is assumed from the hierarchical levels of the objects.

FIG. 11 shows an example of the hierarchical level of each object obtained from an object information group received at the same time when object information is received from the IC tag of a PET bottle in the environment in FIG. 4. An object group as a transmission source group of the object information group (including the object information of the target object) received together with the object information of the target object are located near the target object. Therefore, the object information group is likely to have a hierarchical positional relationship with the target object. However, an actual relationship is kept unknown. For this reason, as shown in FIG. 12, the robot makes a search based on the hierarchical levels of the respective items of received object information on the assumption of the possibility of a hierarchical positional relationship.

First of all, in step S16, the search control unit 3 selects one of the items of received object information at the highest hierarchical level. In the case shown in FIG. 12, the object information of the refrigerator is selected. Although the refrigerator is at the "furniture" level, selecting this is equivalent to taking a procedure of finding a refrigerator first on the assumption that a target PET bottle is in the refrigerator.

In step S17, the object detection unit 4 performs detection processing corresponding to the object by using the detection method in the selected object information (object information of the refrigerator in FIG. 5 in this case).

The image processing unit 4b of the object detection unit 4 receives the detection method (including the identification information of an image processing program, parameters, and the like) in the object information in FIG. 5 from the search control unit 3, and performs region detection processing using a threshold for the detection of the refrigerator. That is, the image processing unit 4b loads the region detection processing program from the memory and executes it. The refrigerator is at the "furniture" level and hence is not included in another object. The robot should therefore find the refrigerator without fail by looking around itself from the point where the robot starts the search. If the refrigerator is detected (detection success), the object detection unit 4 returns corresponding information to the search control unit 3. The process then advances to step S18.

If it is determined in step S18 that the detected object is the target object, the process advances to step S19, in which the search control unit 3 determines the search for the target object has succeeded. If it is determined in step S17 that the detected object is not the target object, the process advances to step S20 to further search the "inside" of the detected object.

In step S20, the search control unit 3 checks whether the object information group obtained in step S15 includes items of object information whose hierarchical level is lower than that of the object detected in step S17. If there are items of object information having a lower hierarchical level, the process advances to step S21 on the assumption that the objects are located in the detected object (refrigerator in this case).

In step S21, the search control unit 3 executes the manipulation method in the object information to search the inside of the detected object (refrigerator in this case). In this case, for example, the manipulation method includes the coordinates of a door handle and the operation of pulling the door handle, and hence the search control unit 3 controls the manipulator manipulation unit 6 to make the arm 104 of the robot 1 pull the door handle.

In the case of the object information in FIG. 5, since relative coordinates from the reference point of the refrigerator object are designated, the robot executes the operation of grasping the designated point by the arm 104 and pulling it toward itself. In execution of manipulation, the robot can move. In the case of an object such as a table whose inside (on the table in practice) can be searched without any special manipulation, information about manipulation is not designated.

When the above manipulation is complete, the process advances to step S22, in which the search control unit 3 selects object information, of the object information group which is obtained in step S15 and lower in hierarchical level than the refrigerator object, which has the highest hierarchical level, and sets the selected information as a new detection target object. The process then returns to step S17. This operation is equivalent to descending by one hierarchical layer along the broken lines in FIG. 12. Since objects lower than the "vessel" level may not be in the refrigerator, the detection processing executed in step S17 may fail.

Note that as shown in FIG. 12, since the detection range on a hierarchical layer lower than the "vessel" level is limited to the inside of the refrigerator, if the target object cannot be detected by image processing upon searching the refrigerator, it can be determined that the detection has failed. If the detection has failed, the process advances to step S20. If the search control unit 3 determines that there are items of object information, of objects equal to or lower than the level of the object for which the detection has failed, which have not been selected as detection targets, the process advances to step S21 to select one of the items of object information which has the highest hierarchical level. The search control unit 3 sets the selected object information as a new detection target. The process then returns to step S17 to repeat the same process as that described above.

Figure 13:
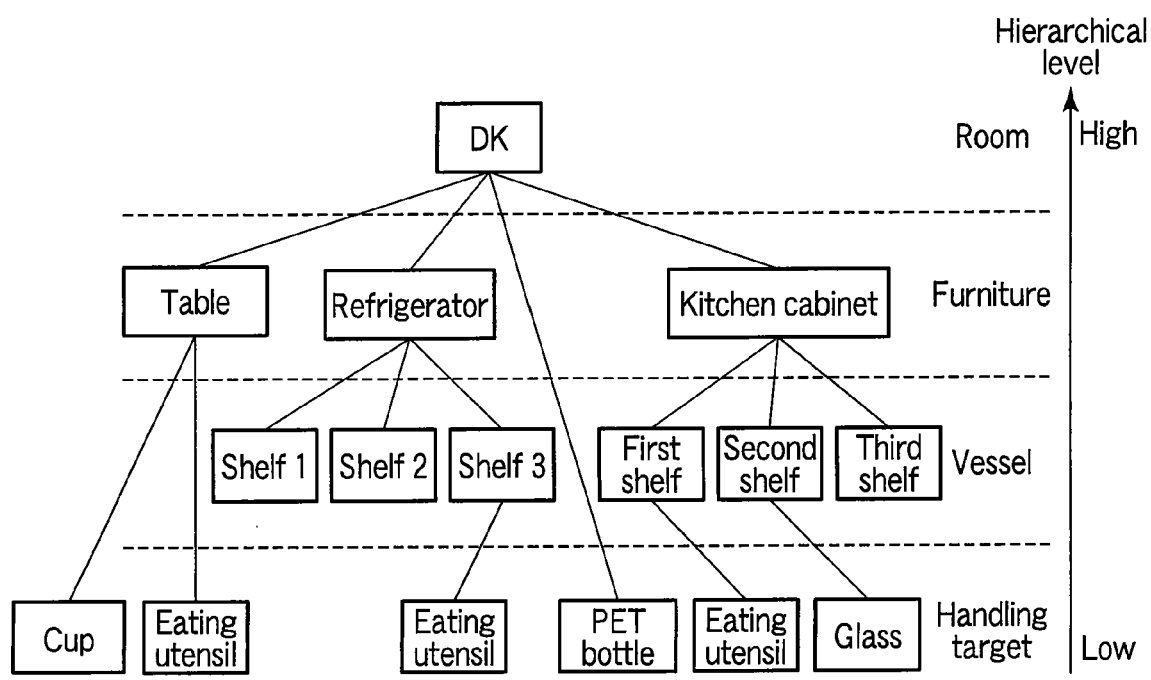
FIG. 13 is a view showing another concrete example of the hierarchical positional relationship between objects scattered in a DK environment.

The hierarchical relationship in FIG. 9 represents a case in which a PET bottle as a target object is found by a search with the refrigerator serving as the vertex of the hierarchy. Even if the PET bottle is placed on the floor of the room as in the hierarchical structure in FIG. 13 and happens to be located near the refrigerator, the hierarchical relationship in FIG. 12 is inevitably expected. In this case, the target object cannot be found by any search with the refrigerator serving as the vertex of the hierarchy. Finally, the process advances from step S20 to step S25.

If the search control unit 3 determines in step S25 that the object information group obtained in step S15 includes object information corresponding to an object which could not be detected by the search in the refrigerator, the process returns to step S16. That is, if there is any object outside the refrigerator, the process advances from step S25 to step S16.

In step S16, the search control unit 3 selects one of the items of undetected object information which has the highest hierarchical level, and subsequently starts a new search.

The target object should be basically found by the above processing. If, however, the detection of the target object has failed because, for example, the upper limit of image processing accuracy is exceeded, it is finally determined in step S25 that there is no undetected object. At this point of time, the search is terminated.

The above processing makes it possible to search for a specific object in a situation in which a given object is stored in another object as in a home environment. In addition, since a search is sequentially performed in descending order of hierarchical levels (refrigerator is the search start point in the case in FIG. 12), it is possible to execute a search action along an efficient route, i.e., start a search from a place where a target object is likely to be stored.

In addition, the search control unit 3 selects object information as a detection target in descending order of hierarchical levels, and the object detection unit 4 sequentially detects objects in the order in which they have been selected. That is, if "shelf 2" is detected in "refrigerator", and "PET bottle" is detected from "shelf 2", the hierarchical positional relationship between "refrigerator", "shelf 2", and "PET bottle" is obtained, which indicates that "shelf 2" is located on a hierarchical layer higher than that of "PET bottle", and "refrigerator" is located on a hierarchical layer higher than that of "shelf 2".

In the above description, a target object as a search target is designated. The following exemplifies a search processing sequence for a case in which the storage place of a target object is designated, e.g., a case in which a search instruction like "fetch a PET bottle in a refrigerator" is received.

An outline of the operation of the robot 1 in this case is the same as that in FIG. 7. If a specific room is designated, object information at the "room" level is detected in a search in the room in step S1 in FIG. 7. This operation will be described in detail later.

A sequence for a search in a room will be described with reference to the flowcharts of FIGS. 14 and 15. Note that in this case, an object at the "room", "furniture", or "vessel" level designated as the storage destination of a target object will be referred to as a "designated object", and the hierarchical level of "designated object" will be referred to as "designated level".

Figure 14:
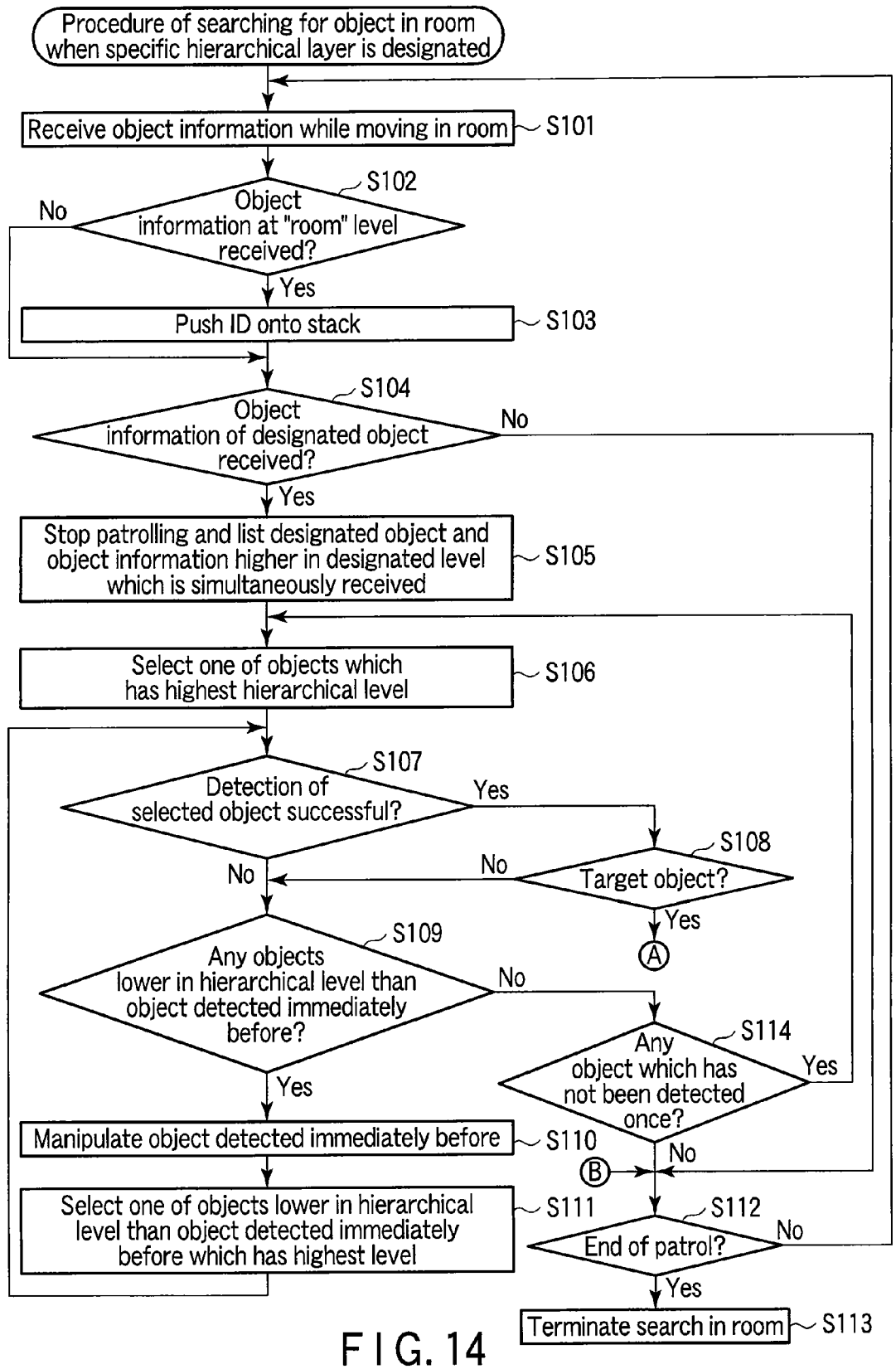
FIG. 14 is a flowchart for explaining a search sequence in a case in which a target object is designated together with an object (designated object) which has the target object and is located on a hierarchical layer higher than the target object.
Figure 15:
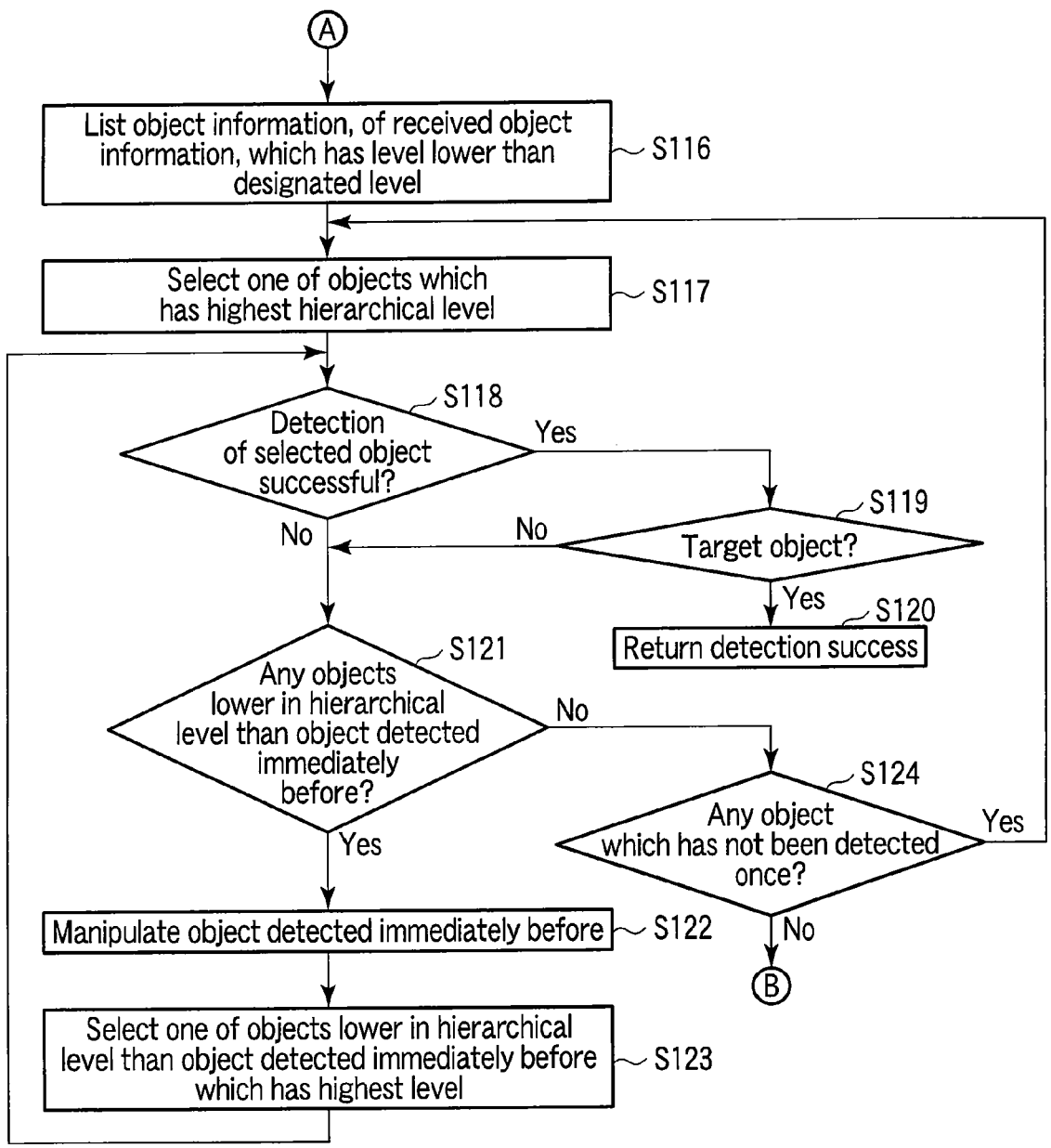
FIG. 15 is a flowchart for explaining a search sequence in a case in which a target object is designated together with an object (designated object) which has the target object and is located on a hierarchical layer higher than the target object.

The processing sequence in FIGS. 14 and 15 roughly includes the following two sequences:

(1) a sequence of searching for a designated object (steps S106 to S114 in FIG. 14); and (2) a sequence of searching for a target object by searching the inside of a designated object (steps S116 to S124 in FIG. 15).

In each of these two sequences, a search is made for an object in descending order of hierarchical levels on the basis of the hierarchical levels as in the sequence shown in FIG. 7. The difference from the sequence in FIG. 7 is that in the sequence in FIGS. 14 and 15, since it is known that the target object is in the designated object, there is no need to search for other objects at the designated level or search the insides of them. This can limit a search range.

In this case, it is necessary to input the ID (tag ID) of a handling target object and the IDs (tag IDs) of objects having higher hierarchical levels from the input unit 7 or the communication unit 8. The method of inputting the IDs of the respective objects is the same as that described above. That is, the user inputs them by selecting objects from a list of objects or by voice.

The difference from FIG. 8 will be mainly described below with reference to FIGS. 14 and 15.

In step S101 in FIG. 14, the search control unit 3 of the robot 1 issues an instruction to the moving unit 5 to drive the wheels so as to make the tag reading unit 2 read the object information from each IC tag near the robot 1 while making the robot patrol in the room. Upon receiving object information from each IC tag, the search control unit 3 checks whether the items of object information include object information whose hierarchical level is the "room" level or the tag IDs in the items of object information include a tag ID matching the ID of the designated object.

If the items of object information include object information whose hierarchical level is the "room" level (step S102), the process advances to step S103 to push the corresponding object information onto the stack in the search control unit 3. The object information at the "room" level held on the stack is used for movement between rooms in FIG. 7, as described above.

If the items of received object information include no object information whose hierarchical level is the "room" level or includes object information whose hierarchical level is the "room" level, the process advances to step S104 to check whether the items of object information include object information whose tag ID matching the ID of the designated object. If there is no object information having an ID matching the ID of the designated object, the process advances to steps S112 and S101 to express that there is neither designated object nor target object near the current position of the robot 1. The robot 1 keeps patrolling. If it is determined in step S104 that object information having an ID matching the ID of the designated object is received, it indicates that the designated object (and the target object) is located near the current position. The process advances to step S105, in which the search control unit 3 stops patrolling and starts a full-fledged search for the designated object.

Note that the items of object information received in step S101 include neither object information at the "room" level nor object information of the designated object, or no object information is received, the process advances to step S112. If it is determined in step S112 that patrolling in the room is complete, the search in the room is terminated. The process then advances to step S4 in FIG. 7. If patrolling is not complete, the process returns to step S101 to repeat the same sequence.

In step S105 and subsequent steps, search processing is performed after the position of the designated object is narrowed down. First of all, in step S105, the search control unit 3 stops the patrolling/moving action, and records the object information of the designated object and an object information group including object information on a hierarchical layer higher than the designated level in the memory in the search control unit 3.

First of all, in step S106, one item of object information having the highest hierarchical level is selected from the received object information group. In step S107, the object detection unit 4 performs detection processing corresponding to the object by using the detection method in the selected object information. If the object is detected (detection success), the object detection unit 4 returns the corresponding information to the search control unit 3. The process then advances to step S108.

If the search control unit 3 determines in step S108 that the detected object is the designated object, the process advances to step S116 in FIG. 15 to search for the target object by searching the inside of the designated object.

If the object detected in step S107 is not the designated object, the process advances to step S109 to further search a hierarchical layer lower than that of the detected object, i.e., "inside".

In step S109, the search control unit 3 checks whether the object information group obtained in step S105 includes object information at a hierarchical level lower than that of the object detected in step S107. If there are items of object information at the lower hierarchical level, the process advances to step S110, assuming that they are in the detected object. If there is no object information at the lower hierarchical level, the process advances to step S114. If it is determined in step S114 that there are items of undetected object information, the process returns to step S106, in which the search control unit 3 selects one of the items of undetected object information which has the highest hierarchical level. Subsequently, the search control unit 3 starts a new search.

In step S110, the search control unit 3 executes the manipulation method in the object information to search the inside of the detected object. After this manipulation, the process advances to step S111 to select an object, of objects lower in hierarchical level than the detected object, which has the highest hierarchical level, and set the selected object as a new detection target object. The process then returns to step S107.

With the above processing sequence, if it is determined in step S108 that the designated object is detected, the process advances to step S116 in FIG. 15 to start searching for the target object. First of all, in step S116, items of object information, of the object information group received in step S101, which have a hierarchical level lower than the designated level are recorded in the memory in the search control unit 3. The processing in step S117 and subsequent steps in FIG. 15 is then performed to sequentially searching the items of object information recorded in the memory in descending order of hierarchical levels to detect the target object. The processing operation in steps S117 to S124 in FIG. 15 is the same as that in step S16 and subsequent steps in FIG. 8, and hence a description of the operation will be omitted.

As described above, if a target object and another object having a higher hierarchical level ("room", "furniture", or "vessel") than the target object are designated, the designated object is detected first, and the target object is searched out by narrowing down to object information at a lower hierarchical level. This can detect the target object at high speed.

The processing operation shown in FIG. 8 or FIGS. 14 and 15 is performed once to cause the object detection unit 4 to detect objects in the order in which they are selected by the search control unit 3. This makes it possible to recognize the hierarchical positional relationship between objects existing in the search range (i.e., the hierarchical positional relationship indicating which objects have which objects). Storing this information allows the use of the information for the next search for the same object or another target object. However, there is a possibility that the hierarchical positional relationship between a plurality of objects obtained as a result of a search is temporary and will have changed when the next search is made. If it can be confirmed that the relationship has not changed, a high-speed search can be performed by using this hierarchical relationship.

In this case, as shown in FIG. 16, the object search apparatus 1 includes a storage unit 10. The storage unit 10 stores the tag IDs of the respective objects obtained when a search was made for a target object in the past and the hierarchical positional relationship between the respective objects as shown in, for example, FIG. 9.

Figure 17:
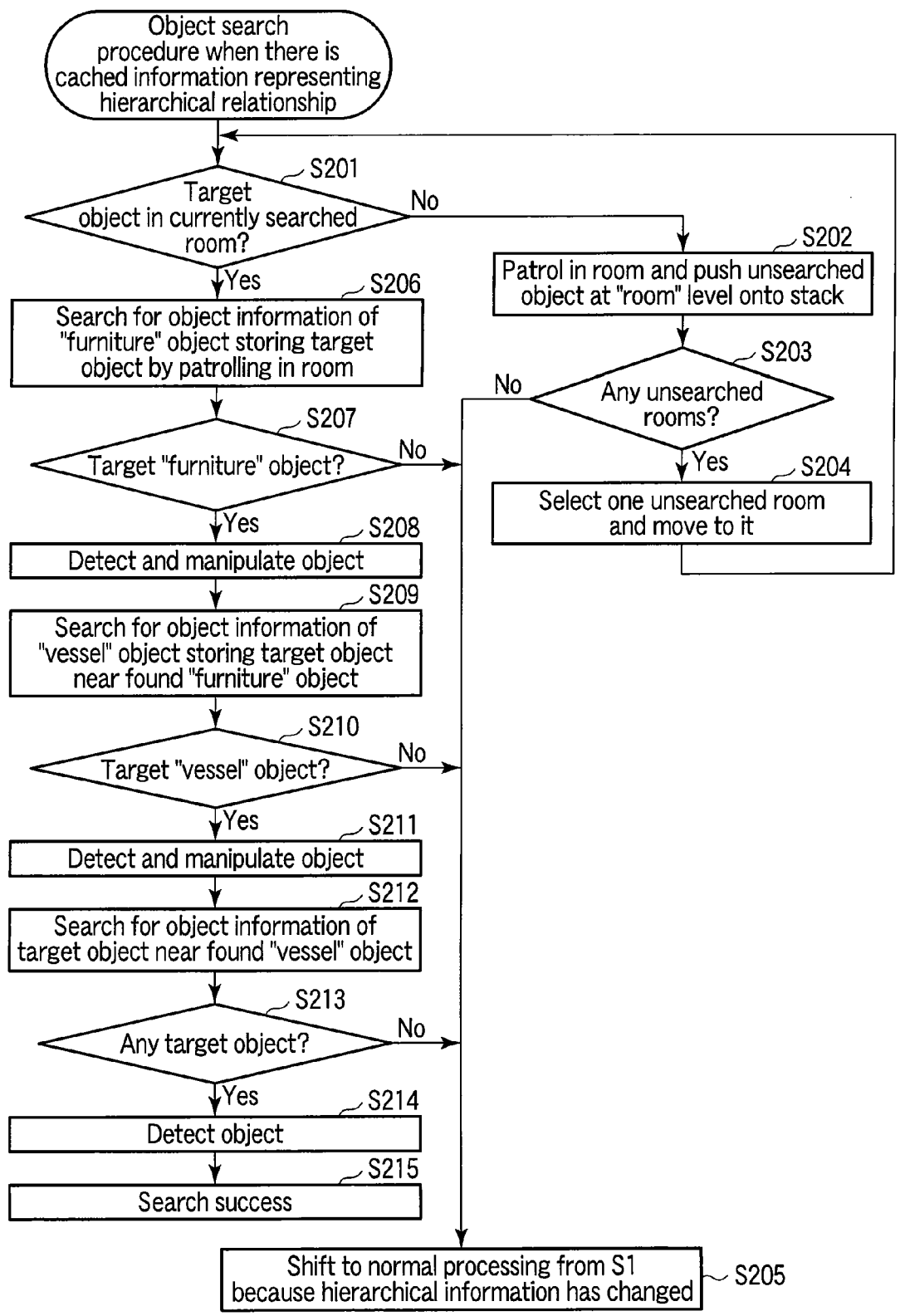
FIG. 17 is a flowchart for explaining a search sequence of searching for a target object by storing, in a storage unit in advance, the hierarchical positional relationship between objects detected by the object detection unit and using the information stored in the storage unit.

The processing operation performed by the object search apparatus 1 in FIG. 16 to search for a target object by using the information stored in the storage unit 10 will be described next with reference to the flowchart shown in FIG. 17.

The following is a processing sequence for a case in which when a hierarchical positional relationship like that shown in FIG. 9 is stored in the storage unit 10 at the time of a search for a PET bottle in the past, an instruction to fetch an eating utensil in a refrigerator is newly issued.

The search control unit 3 of the robot 1 reads, from the storage unit 10, the tag IDs of a "vessel" object in which a target object is stored, "furniture" object in which the "vessel" object is stored, and a "room" object in which the "furniture" object is stored. Since the room, furniture, and vessel objects in which the target object is stored in this manner are already known, the robot moves to the room in which the target object is present (steps S201 to S204). In this case, the robot moves around in the room while the search control unit 3 receives object information. When the search control unit 3 receives the object information of the room in which the target object is present, the object detection unit 4 detects the room (e.g., a door in this case) by using the detection method in the object information. The robot then opens the door by the manipulation of the manipulator manipulation unit 6 and moves into the room by using the manipulation method in the object information. The process then advances from step S201 to step S206.

The robot 1 patrols in the room in step S206, and receives the object information of furniture containing the target object in step S207. At this time, the robot receives the object information of each object near (in) the furniture, together with the object information of the furniture. If the target object is present in the furniture, the received object information includes the object information of the target object. In step S208, the object detection unit 4 detects the furniture by using the detection method in the object information of the furniture, and the robot opens the door of the furniture by manipulating the manipulator manipulation unit 6 using the manipulation method in the object information. The process then advances to step S209.

In steps S209 to S211, the robot 1 detects an object at the "vessel" level by using object information, of the object information group received together with the object information of the furniture, which is at the "vessel" level in the furniture, and manipulates the object to move to a lower hierarchical layer.

In steps S212 to S214, the robot 1 detects the target object by using the detection method in the object information of the target object which is included in the object information group received together with the items of object information of the furniture and vessel.

Assume that it is determined in step S207 that object information at the target "furniture" level could not be received, or it is determined in step S210 that object information at the target "furniture" level could be received but object information at the target "vessel" level could not be received, or it is determined in step S213 that items of object information at the target "furniture" level and the target "vessel" level could be received but the object information of the target object could not be received. In such a case, it is highly possible that the hierarchical positional relationship between these objects has changed in the interval between a past search and the present, and hence the process advances to step S205 to start the normal search processing shown in FIGS. 7 and 8. After the normal search processing is performed, the storage unit 10 is updated. That is, the hierarchical positional relationship between the respective objects which was obtained by the search processing is stored in the storage unit 10.

Since the hierarchical positional relationship between objects in an environment to be searched is unknown at first, the robot finds a target object while performing an exhaustive search like that shown in FIG. 8. However, repeating a search will gradually clarify the hierarchical positional relationship between the respective objects in the environment. This makes it possible to efficiently detect objects whose hierarchical positional relationship is stored in the storage unit 10 by using the information. On the other hand, since the hierarchical positional relationship stored in the storage unit 10 is the one at a given time point in the past, it is possible that the relationship will have changed at the time of a new search. If such a change is detected, an exhaustive search is performed again, and the information stored in the storage unit 10 is updated with the result.

As described above, according to the above embodiment, this robot acquires an object information group including the object information of a target object by using the tag reading unit 2 which acquires, from the IC tag which each object has, object information including the identifier of the object, the hierarchical level, a detection method for detecting the object, and a manipulation method for the object which is used to shift to a hierarchical layer lower than the object. The robot then detects the target object by sequentially detecting objects higher in hierarchical level than the target object and objects which the objects have, in descending order of hierarchical levels, using the detection method and manipulation method in each object information. This makes it possible to easily search for a plurality of scattered objects.

IC tags are affixed in advance to objects ("handling target" grasped and carried by the robot, "vessel" such as a box or drawer in which a handling target is placed, "furniture" such as a table or refrigerator on or in which a vessel is placed, "room" in which furniture is placed, and the like are expressed as objects). An IC tag stores object information including information (detection method) such as an ID (tag ID) unique to the object, a hierarchical level representing to which one of hierarchical layers including "handling target", "vessel", "furniture", and "room" the object belongs, and the ID of a recognition program and parameters for the detection of the object, and a manipulation method for reaching a position at which an object which the above object has and is lower in hierarchical level than the above object (for example, a manipulation method for the object which is used to shift to a hierarchical layer lower than the object, including information such as a grasping point and grasping posture to grasp and open a door and an operating direction). Alternatively, the object information can be read from a database by using the tag ID read from the IC tag as a key. Hierarchical levels are defined as the "room", "furniture", "vessel", and "handling target" levels in descending order.

When searching for a target object, the robot patrols each room until the object information of the target object is received. Upon receiving an object information group including the object information of the target object, the robot detects objects in descending order of hierarchical levels. When performing detection in this order, this robot starts a search from an object which is easily found because it is large in size and is located outside an object placed in the large object. If the robot finds, for example, an object at the "furniture" level during the search, the robot detects a vessel assuming that an object at the "vessel" level is placed in the found object. The robot executes detection processing on another hierarchical layer assuming that an object on a lower hierarchical layer is placed in a found object. The robot repeats this search until the target object is found.

With this arrangement, it is possible to easily search for a target object without storing/managing in advance the hierarchical positional relationship between a plurality of objects scattered in an environment (hierarchical position relationship indicating which objects have which objects). It therefore suffices to prepare only a mechanism which can acquire hierarchical levels from the respective objects. This can greatly simplify the apparatus arrangement. On the other hand, in an actual search action, a search order is automatically generated, which is configured to find first furniture and a vessel in which target objects are likely to be placed. Therefore, even in an environment in which the positional relationship between objects has a hierarchical structure, the reliability of a search for a specific object can be expected to be improved.

The techniques of the present invention which have been described in the embodiment of the present invention can be delivered, as computer-executable programs, by being stored in a recoding medium such as a magnetic disk (flexible disk, hard disk, or the like), an optical disk (CD-ROM, DVD, or the like), or a semiconductor memory.

What is claimed is:

1. An object search apparatus comprising:
    an acquisition unit configured to acquire, from each IC tag of a plurality of IC tags corresponding to a plurality of objects respectively, an object information item including an identifier of an object, a hierarchical level, a detection method for detection of the object, and a manipulation method for the object, to obtain a plurality of object information items including a target object information item of a target object;
    a selection unit configured to select, from the object information items acquired, one of object information item higher in the hierarchical level than the target object and the target information item of the target object, in descending order of the hierarchical levels, to obtain selected object information item;
    a detection unit configured to detect an object corresponding to the selected object information item by using the detection method in the selected object information item, to obtain a detected object; and
    a manipulation unit configured to manipulate the detected object when the detected object is not the target object, in accordance with the manipulation method in the selected object information item,
    wherein the selection unit select another object information item whose hierarchical level is lower than that of the detected object and is equal to or higher than the hierarchical level of the target object, until the target object is detected by the detection unit.

2. The apparatus according to claim 1, wherein
    each object belongs to one of a plurality of hierarchical levels, and
    the selection unit selects the one of the object information items which is lower in hierarchical level than a highest level of the hierarchical levels.

3. The apparatus according to claim 1, wherein the manipulation method included in the selected object information item includes a method for manipulating the object corresponding to the selected object information item in order to detect another object from the object, the hierarchical level of the another object being lower than that of the object.

4. The apparatus according to claim 1, wherein the manipulation method included in the selected object information item includes a handling method for the object corresponding to the selected object information item.

5. The apparatus according claim 1, wherein
the selection unit includes
a first selection unit configured to select one of an object information item of a designated object higher in the hierarchical level than the target object and an object information item higher in the hierarchical level than the designated object, in descending order of the hierarchical levels, and
a second selection unit configured to select one of an object information items lower in the hierarchical level than the designated object, in descending order of the hierarchical levels, and
the detection unit detects the designated object by detecting each object selected by the first selection unit, and detects, from the designated object, the target object by detecting each object selected by the second selection unit.

6. The apparatus according to claim 1, further comprises a memory to store a hierarchical positional relationship in objects detected by the detection unit, and wherein
the selection unit selects the one of an object information item of the target object and an object information item of an upper-level object which is higher in the hierarchical level than the target object and includes the target object, in descending order of the hierarchical levels, and
the detection unit detects the upper-level object and then detects the target object in the upper-level object.

7. The apparatus according to claim 1, wherein the detection method included in the selected object information item includes a type of image processing for detecting the object corresponding to the selected object information item and a parameter used for the image processing.

8. An object search method in an object search apparatus comprising
acquiring, from each IC tag of a plurality of IC tags corresponding to a plurality of objects respectively, an object information item including an identifier of an object, a hierarchical level, a detection method for detection of the object, and a manipulation method for the object, to obtain a plurality of object information items including a target object information item of a target object;
selecting, from the object information items acquired, a first object information item higher in the hierarchical level than the target object;
detecting a first object corresponding to the first object information item by using the detection method in the first object information item;
manipulating the first object in accordance with the manipulation method in the first object information item; and
detecting the target object from the first object by using the target object information item whose hierarchical level is lower than that of the first object.

9. The method according to claim 8, wherein detecting the target object includes
selecting, from the object information items acquired, a second object information item whose hierarchical level is lower than that of the first object and is higher than that of the target object;
detecting a second object from the first object by using the detection method in the second object information item;
selecting, from the object information items acquired, the target object information item of the target object; and
detecting the target object from the second object by using the detection method in the target object information item.

* * * * *